(12) United States Patent
Cho

(10) Patent No.: US 7,771,862 B2
(45) Date of Patent: Aug. 10, 2010

(54) CAP ASSEMBLY AND A SAFETY VALVE FOR A SECONDARY BATTERY

(75) Inventor: Kyu-Woong Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1484 days.

(21) Appl. No.: 11/132,036

(22) Filed: May 18, 2005

(65) Prior Publication Data

US 2005/0277017 A1    Dec. 15, 2005

(30) Foreign Application Priority Data

May 19, 2004    (KR) .................. 10-2004-0035481

(51) Int. Cl.
    H01M 2/12    (2006.01)
    B65D 51/16    (2006.01)

(52) U.S. Cl. .................. 429/56; 429/82; 429/53; 220/367.1

(58) Field of Classification Search .................. None
    See application file for complete search history.

(56) References Cited

U.S. PATENT DOCUMENTS

| | | | |
|---|---|---|---|
| 5,490,320 A | * | 2/1996 | Hasegawa et al. .......... 29/623.1 |
| 6,242,126 B1 | * | 6/2001 | Mori et al. .................. 429/53 |
| 6,468,692 B1 | * | 10/2002 | Nemoto et al. .............. 429/174 |

FOREIGN PATENT DOCUMENTS

| | | |
|---|---|---|
| JP | 2-121256 A | 5/1990 |
| JP | 10-188934 | 7/1998 |
| JP | 10-247483 | 9/1998 |
| JP | 11-162435 A | 6/1999 |
| JP | 11162435 * | 6/1999 |
| JP | 2000-82457 | 3/2000 |
| JP | 2000-223102 | 8/2000 |
| JP | 2001-185113 A | 7/2001 |
| JP | 2002-56836 A | 2/2002 |
| JP | 2003-168410 | 6/2003 |
| JP | 2003-297323 A | 10/2003 |
| JP | 2003-297325 A | 10/2003 |

OTHER PUBLICATIONS

JPO IPDL machine translation of JP 11162435, published on Jun. 18, 1999, retrieved on May 14, 2009.*
Patent Abstracts of Japan, Publication No. 10-247483, dated Sep. 14, 1998, in the name of Keisuke Yamamoto et al.
Patent Abstracts of Japan for Publication No. 2003-168410; Date of publication of application Jun. 13, 2003 in the name of Tome et al.

(Continued)

Primary Examiner—Dah-Wei D Yuan
Assistant Examiner—Katherine Turner
(74) Attorney, Agent, or Firm—Christie, Parker & Hale, LLP

(57) ABSTRACT

A secondary battery with a maximized cycle-life having a multi-stage safety valve so as to lower the inner pressure of the battery in stages. The multi-stage safety valve is installed on a case and the secondary battery is equipped with an electrode assembly including both positive and negative electrodes and a separator interposed therebetween.

11 Claims, 2 Drawing Sheets

OTHER PUBLICATIONS

Patent Abstract of Japan, Publication No. 2000-223102, Published on Aug. 11, 2000, in the name of Watanuki et al.

Patent Abstracts of Japan for Publication No. 2000-082457; Date of publication of application Mar. 21, 2000, in the name of Takashi Fujii et al.

Patent Abstracts of Japan for Publication No. 10-188934; Date of publication of application Jul. 21, 1998, in the name of Kuniyasu Oya.

* cited by examiner

CAP ASSEMBLY AND A SAFETY VALVE FOR A SECONDARY BATTERY

CROSS REFERENCE TO RELATED APPLICATION

This application claims priority to and the benefit of Korean Patent Application No. 10-2004-0035481 filed on May 19, 2004, in the Korean Intellectual Property Office, the entire disclosure of which is incorporated herein by reference.

FIELD OF THE INVENTION

The present invention relates to a secondary battery, and more particularly to a secondary battery equipped with a double safety apparatus in order to extend its cycle-life.

BACKGROUND OF THE INVENTION

Generally, unlike a primary battery that is incapable of being recharged, a secondary battery may be repeatedly charged and discharged. Recently, a high power secondary battery using a non-aqueous electrolyte having high energy density has been developed. When one battery cell is packaged into a pack shape, it forms a low capacity battery that may be used as a power source for various portable small electronic devices such as cellular phones, laptop computers, and camcorders. When several tens of battery cells are connected in series or in parallel, a high capacity secondary battery is formed which may be used as a power source for driving motors such as in a hybrid electric automobile.

Such a high capacity secondary battery is typically assembled in series by connecting a plurality of secondary batteries. Each of the plurality of secondary batteries is composed of an electrode assembly, a case, and a cap assembly.

The battery may be fabricated into various shapes such as cylindrical and prismatic shapes, wherein an electrode assembly thereof has a bar of positive and negative electrode sheets and an insulator separator interposed therebetween that is wound (as a jelly roll) and inserted into a case. The case is then mounted with a cap assembly formed with an outer terminal to provide a battery.

The cap assembly of a secondary battery additionally may include a safety apparatus designed to rupture at a predetermined pressure level and allow trapped gas to escape for the purpose of preventing an explosion of the battery. The cap assembly typically includes an outer terminal that is electrically connected to the electrodes of the electrode assembly and a gasket sealing the case.

A secondary battery may be equipped with a protection circuit for detecting excessive current and intercepting it during charge and discharge of the battery. In other words, a safety apparatus is provided to reduce the possibility of explosion or combustion of a battery due to its inner pressure increasing during a chemical reaction in the case of abnormal operation of the protection circuit or unexpected occurrence of irregular reactions in the battery.

A conventional method of preventing an explosion of a battery includes equipping a cap plate on the case with a pressure releasing valve that ruptures at a predetermined pressure level, as disclosed in Japanese Patent laid-open No. 2000-223102. However, this conventional art has a problem in that a battery may be damaged by outside air and water flowing into the battery after the pressure releasing valve ruptures to emit gas from the battery due to singular structure of the release valve. In other words, the conventional valve eventually results in destruction of the battery by immediately rupturing at the predetermined maximum pressure level that it can sustain, and nullifying the air-tightness inside the battery.

This problem decreases the cycle-life of a battery and also reduces the battery characteristics of a high capacity secondary battery for a hybrid electric vehicle (HEV), because a battery for an HEV requires a particularly high output and large capacity. This means that the high capacity secondary battery contains a much greater energy and has a higher change in inner pressure than a regular battery, resulting in easier rupture of a pressure releasing valve installed therein.

Thus, there is a need for a secondary battery with an improved safety valve that allows the inner pressure of a secondary batter to be lowered in stages.

SUMMARY OF THE INVENTION

A secondary battery in accordance with the present invention is equipped with a safety valve for lowering the inner pressure of a battery in stages. The case includes an electrode assembly comprising both positive and negative electrodes and a separator interposed therebetween.

The aforementioned secondary battery can be equipped in a prismatic or cylindrical case, and the electrode assembly can have a jelly-roll or laminated shape.

In addition, the aforementioned secondary battery can be used as the power source for high power electric devices such as electric vehicles, hybrid electric vehicles, wireless vacuum cleaners, motorbikes, and motor scooters.

The aforementioned safety valve is advantageously equipped in one side of a cap assembly having a terminal that is electrically connected to the electrode assembly, and seals and closes a case.

The safety valve may include more than one valve through which the gas inside the battery can pass before it is emitted out of the battery. Accordingly, this multi-stage safety valve enables the inner pressure of a battery to be lowered in more than one stage, yet not compromise the airtight characteristic of the battery.

The safety valve may include at least two inner pressure plates that can open at predetermined pressure levels as the inner pressure of a secondary battery increases. The safety valve may also include spaces between the inner pressure plates, and between a final pressure plate connected to the outermost inner pressure plate.

The inner and final pressure plates can have the same or different breaking strengths. In one embodiment the breaking strength of the plates is increased from the interior toward the exterior.

In another embodiment the safety valve can include only two pressure plates: an inner plate opening at a predetermined pressure level as the inner pressure of a secondary battery increases, and a final pressure plate connected to the inner pressure plate with a space therebetween and releasing gas to the outside at a predetermined pressure level.

When the inner pressure plate opens as the inner pressure of a battery increases, the space formed between the inner pressure plate and the final pressure plate allows the inner pressure of a battery to decrease, while maintaining the air-tightness therein.

The safety valve of the present invention is not limited to only two pressure plates as mentioned above, but can be fabricated to have several inner pressure plates with spaces between each arrayed plate and a final plate connected to the outside and adapted to release gas, so that the inner pressure of a battery can be lowered in multiple stages before the air-tightness inside the battery is nullified.

Each pressure plate included in the aforementioned safety valve may be formed in a thin-plate structure with at least one groove fabricated to be thinner than the other parts, so that the plate can open at a predetermined pressure level.

According to an embodiment of the present invention, a cap assembly applied to a prismatic secondary battery includes a cap plate combined with a case to make the case air-tight. The cap plate includes a positive electrode terminal and a negative electrode terminal electrically connected with an electrode assembly installed inside the case, and a multi-stage safety valve equipped in the cap plate for lowering the inner pressure of a battery in multiple stages.

According to another embodiment of the present invention, a cap assembly applied to a cylindrical secondary battery includes a cap plate with an external terminal electrically connected to an electrode assembly inside the battery, a gasket insulating it from a case, and a multi-stage safety valve equipped inside the cap plate for lowering the inner pressure of a battery.

In addition, an exemplary safety valve of the present invention includes several pressure plates opening at predetermined pressure levels and spaces located between each plate for lowering the inner pressure of the battery when the plates are opened.

The present invention provides a secondary battery with a safety valve equipped in a cap assembly which lowers the inner pressure of the battery in multiple stages.

The present invention also provides a secondary battery equipped with an electrode assembly having both positive negative electrodes and a separator interposed therebetween in a case wherein a multi-stage safety valve is equipped at one side of the case.

DETAILED DESCRIPTION

Figure 1:
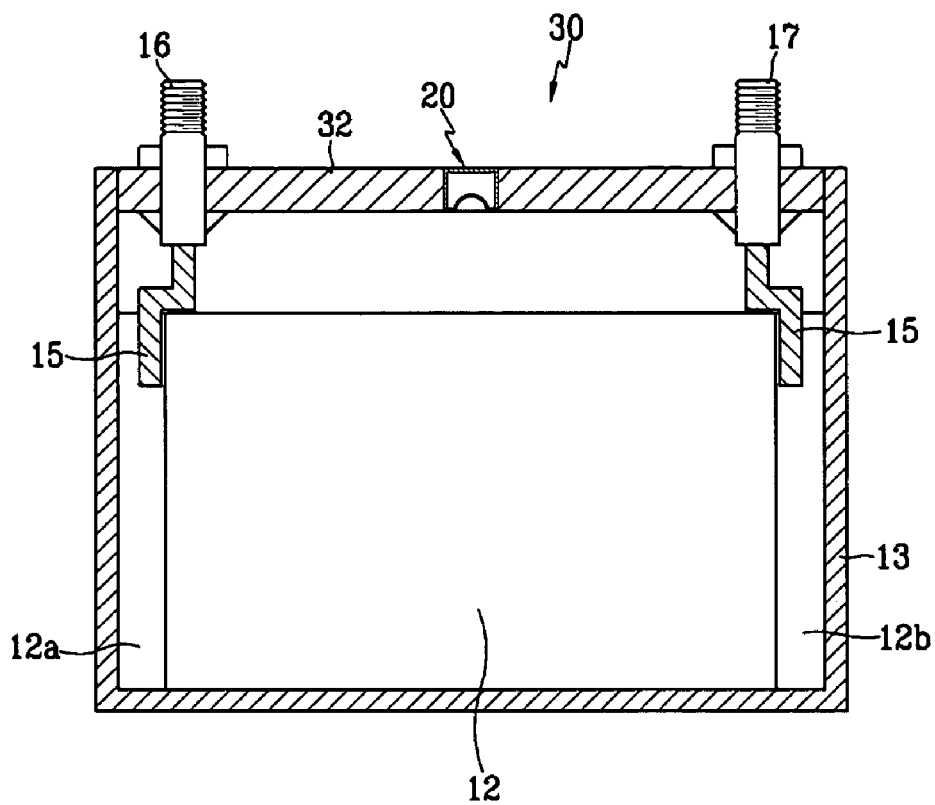
FIG. 1 is a cross-sectional view of a secondary battery according to an embodiment of the present invention.

First, illustrating a prismatic secondary battery with reference to the aforementioned drawings, the secondary battery includes an electrode assembly 12 having both positive and negative electrodes and a separator interposed therebetween, a case 13 with a space for enclosing the electrode assembly and a cap assembly 30 at the opening of the case for sealing it. The secondary battery also includes a positive electrode terminal 16 and a negative electrode terminal 17 electrically connected to the positive electrode and the negative electrode, respectively, through tabs 15 and projected out of the cap assembly 30. A multi-stage safety valve 20 is located in the cap assembly 30. The multi-stage safety valve 20 helps improve the safety and reliability of a battery by lowering the inner pressure of the battery in multiple stages.

The case 13 may be fabricated out of aluminum, an aluminum alloy, or a conductive metal such as steel plated with nickel, and its shape can hexagonal, for example, with a space inside wherein an electrode assembly 12 can be housed.

The electrode assembly 12 in an exemplary embodiment of the present invention has a jelly-roll configuration formed by winding positive and negative electrodes together with a separator interposed therebetween after laminating both electrodes by coating active materials on current collectors. In addition, the electrode assembly has positive and negative uncoated regions 12a, 12b connected to the positive and negative electrode terminals, respectively, at opposing sides of the electrode assembly 12 through the tabs 15 (or current collecting plates).

To illustrate in further detail, the aforementioned cap assembly 30 includes a cap plate 32 combined on top of the case 13 with a gasket, the cap plate sealing the case to be air-tight. Positive and negative electrode terminals 16, 17 are located at both sides of the cap plate electrically connected to the uncoated regions 12a, 12b, respectively, of the electrode assembly. The tabs and a safety valve 20 arranged in the center of the aforementioned cap plate 32. According to this embodiment of the present invention, the safety valve 20 is designed to lower the inner pressure of a battery in two stages, but the safety valve is not particularly limited to limiting the pressure in two stages.

Figure 2:
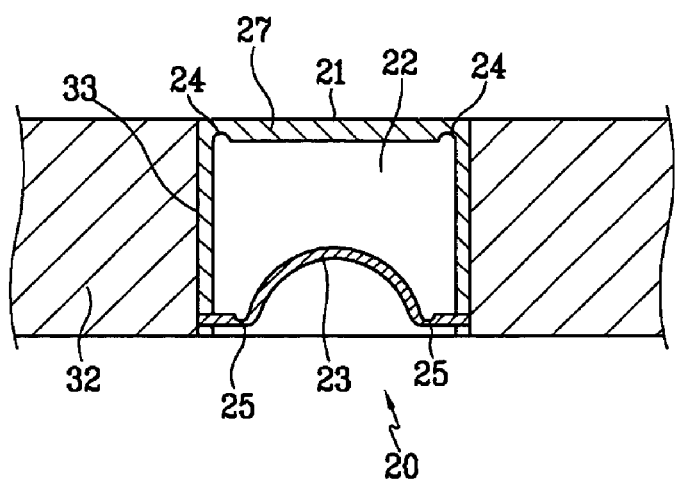
FIG. 2 is a cross-sectional view fully illustrating a safety valve of a secondary battery according to an embodiment of the present invention.

As shown in more detail in FIG. 2, the safety valve 20 includes a final pressure plate 21 located at the opening 33 formed on the cap plate 32 with one surface 27, facing the outside and rupturing at a predetermined pressure level to release gas, and an inner pressure plate 23 spaced from the final pressure plate facing the inside of the battery, and rupturing at a predetermined inner pressure level.

Therefore, the battery can still be efficient with the final pressure plate 21 open if the inner pressure of the battery is lowered due to gas flowing into the space 22 between the inner pressure plate 23 and the final pressure plate 21.

As further shown in FIG. 2, the surface 27 of final pressure plate 21 is flat and has a groove 24 formed at its surface edge perimeter so that it can easily rupture as the inner pressure of the battery increases.

The inner pressure plate 23 is convexly formed toward the final pressure plate 21 and the space 22 therebetween is air-tight. A groove 25 is formed at the perimeter of the inner pressure plate 23 so that the inner pressure plate can easily rupture as the inner pressure of the battery increases.

Embodiments of the present invention have no particular limits as to the thickness of each pressure plate 21, 23 or as to the thickness and structure of grooves 24, 25 on the safety valve 20, and these dimensions can be changed depending on the characteristics and the inner pressure requirements of the battery.

The operation of the aforementioned safety valve will now be discussed.

The safety valve 20 located in the cap plate 32 lowers the inner pressure of the battery in stages when the inner pressure of the battery increases due to gas generated during the operation of the battery. Eventually gas may be released out of the case, decreasing the possibility of explosion of the battery.

If the inner pressure increases to greater than a predetermined pressure level, the groove 25 formed on the inner pressure plate 23 ruptures, opening the inner pressure plate 23. The opening of the inner pressure plate 23 causes the gas discharged therefrom to flow into the space 22 between the inner pressure plate 23 and the final pressure plate 21, lowering the inner pressure of the battery. Accordingly, even if the inner pressure of the battery is lowered, the final pressure plate 21 does not open, which maintains the sealing of the battery and results in a longer use of the battery However, if the inner pressure of the battery continuously increases to a level greater than the predetermined pressure level, the groove 24 of the final pressure plate 21 finally ruptures, releasing gas out of a battery case, preventing explosion of the battery.

Therefore, the present invention improves the cycle-life of a battery by lowering the inner pressure in multiple stages before finally releasing gas out of the battery.

A cylindrical secondary battery according to another embodiment of the present invention will now be illustrated with reference to FIG. 3 which is a cross-sectional view of a cylindrical secondary battery.

Figure 3:
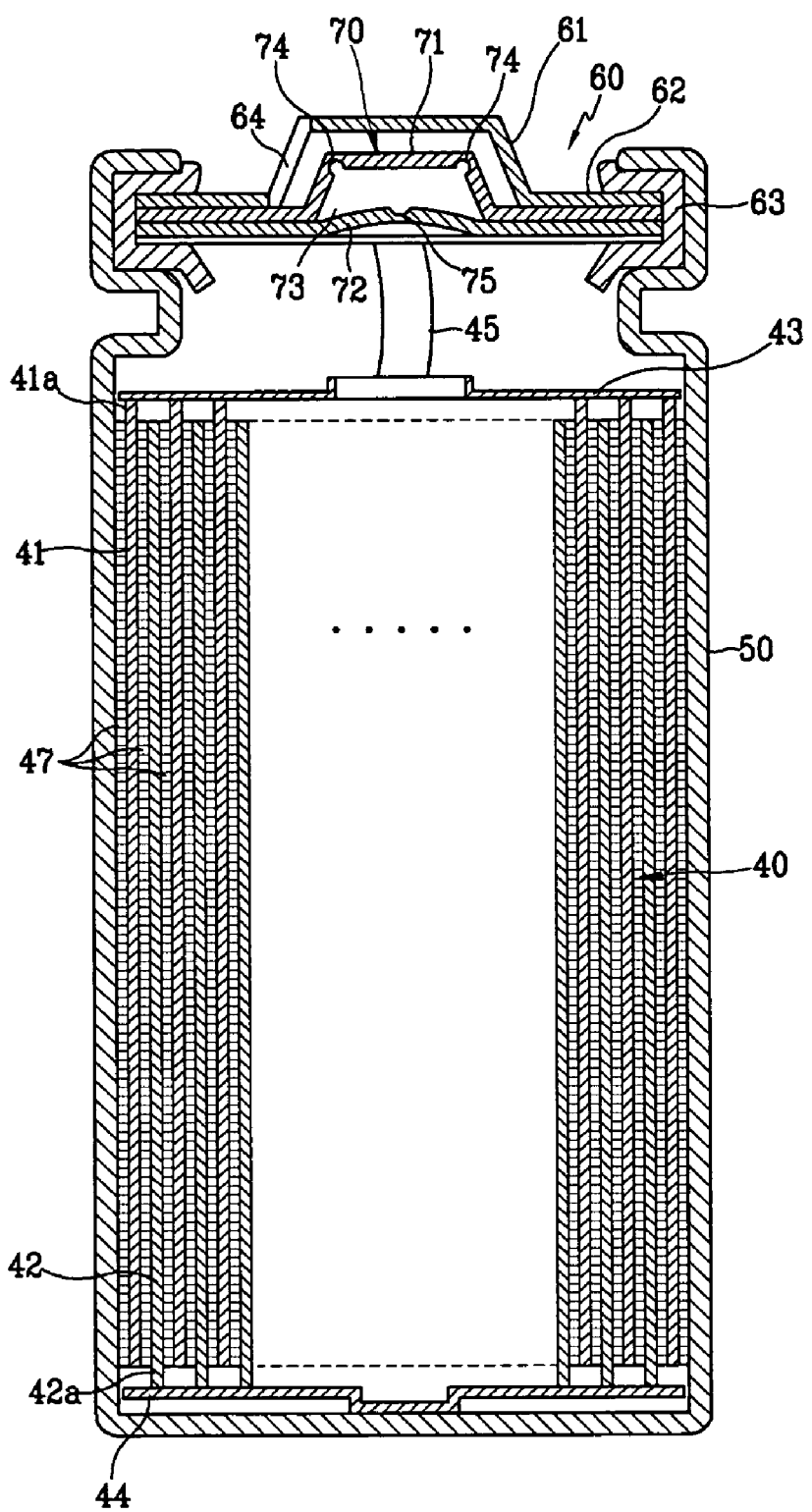
FIG. 3 is a cross-sectional view of a secondary battery according to another embodiment of the present invention.

As shown in FIG. 3, the cylindrical secondary battery includes an electrode assembly 40 having a positive electrode 41, a negative electrode 42, and a separator 47 interposed therebetween. The secondary battery also contains a cylindrical case 50 containing the electrode assembly and an electrolyte, the case being electrically connected with the electrode assembly. A cap assembly 60 is housed on top of the opening of the case 50 and seals it, the cap assembly being electrically connected to the electrode assembly 40. A multi-stage safety valve 70 is housed in the cap assembly 60 for lowering the inner pressure of the battery in stages.

In this embodiment, the electrode assembly 40 has a jelly-roll configuration formed by winding a positive electrode 41, a negative electrode 42, and a separator 47 interposed therebetween, the electrode assembly being inserted into a case 50. The uncoated region 42a of the negative electrode 42 is located at the bottom of the case and is electrically connected to a negative current collecting plate 44. The uncoated region 41a of the positive electrode 41 is located on top of the case and is electrically connected with the cap assembly 60 through a positive current collecting plate 43 and a lead 45 when the cap assembly is located in an upper direction.

In addition, the cap assembly 60 includes a cap plate 62 on which a positive electrode terminal 61 is formed to be electrically connected with the positive electrode 41 and projected outside, a gasket 63 insulating the cap plate 62 from the case 50, and a safety valve 70 inside the positive electrode terminal 61 of the cap plate 62.

Furthermore, the positive electrode terminal 61 formed on the cap plate 62 has a hole 64 on its surface so that gas inside the battery can be discharged when the safety valve 70 opens to the outside.

The safety valve 70 applied to the secondary battery of this embodiment includes a final pressure plate 71 and an air-tight space between the cap plate 62 and the gasket 63 located inside the positive electrode terminal 61. The final pressure plate 71 is adapted to open and release gas at a predetermined pressure level of the battery. The safety valve 70 also includes an inner pressure plate 72 equipped inside the battery spaced from the final pressure plate, and adapted to open at a predetermined inner pressure level.

Therefore, even if the inner pressure plate 72 opens at a predetermined inner pressure level, the battery can maintain operation because the final pressure plate 71 is still closed. Gas released into the space 73 between the inner pressure plate 72 and the final pressure plate 71 lowers the inner pressure of the battery to reduce the risk of explosion, but since the final pressure plate 71 remains closed, the battery is still operable. The safety valve 70 is located inside the positive electrode terminal 61 formed on the cap plate 62 to protect the battery from external conditions.

The final pressure plate 71 protrudes externally so as to correspond to the positive electrode terminal 61 which protrudes out of the cap plate 62, and at least one groove 74 is formed thereon which allows the plate 71 to rupture as the inner pressure of the battery increases.

In addition, the inner pressure plate 72 is connected to the final pressure plate 71 by a gasket 63, and is convexly curved toward an air-tight space 73. The inner pressure plate 72 has at least one groove 75 formed thereon so that it can easily rupture when the inner pressure increases.

The thickness of each pressure plate 71, 72 and the thickness and structure of grooves 74, 75 have no particular limits, but rather can vary depending on the characteristics and inner pressure conditions of the battery.

If the inner pressure of the cylindrical secondary battery increases to more than a predetermined level, the groove 75 on the inner pressure plate 72 ruptures first and releases gas into a space 73, lowering the inner pressure of the secondary battery. The final pressure plate 71 is still sealed at this point, maintaining continuous use of the battery even when the inner pressure plate 72 is open.

However, if the inner pressure of the battery keeps increasing to more than a predetermined level, the groove 74 on the final pressure plate 71 ruptures and releases the inner gas out of the final plate 71, and then emits it to the outside through the hole 64 formed at the positive electrode terminal 61 of the cap plate 62.

The secondary battery and battery module of the present invention can be effectively used for an HEV requiring high output/large capacity, but is not limited thereto.

According to the aforementioned embodiments of the present invention, the present invention can improve the cycle-life of a battery as well as establish its safety by enabling a battery itself to lower the inner pressure therein without releasing gas to the outside.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A secondary battery comprising an electrode assembly inside a case, the electrode assembly including a positive electrode, a negative electrode and a separator interposed between the positive electrode and the negative electrode, and a multi-stage safety valve mounted in the case, the multi-stage safety valve being rupturable in stages for lowering the inner pressure of the secondary battery;

wherein the multi-stage safety valve includes at least one inner rupturable pressure plate adapted to open at a first pressure level and a final rupturable pressure plate adapted to release gas from the battery at a second pressure level, and wherein the at least one inner rupturable pressure plate is not in contact with the final rupturable pressure plate;

wherein the at least one inner pressure plate has a surface comprising at least one rupturable groove; and wherein the final pressure plate has at least one rupturable groove on a surface thereof.

2. The secondary battery of claim 1, wherein the safety valve is installed inside a cap assembly having an external terminal, the cap assembly being adapted to seal the case.

3. The secondary battery of claim 1, wherein there is a space between the at least one inner rupturable pressure plate and the final rupturable pressure plate for accepting discharge gas upon rupture of the at least one inner pressure plate.

4. The secondary battery of claim 1, wherein the multi-stage safety valve is a double safety valve comprising both one inner rupturable pressure plate and one final rupturable pressure plate.

5. The secondary battery of claim 1, wherein the inner rupturable pressure plate and the final rupturable pressure plate have the same rupture strengths.

6. The secondary battery of claim 1, wherein the inner pressure plate and the final pressure plates have different rupture strengths.

7. The secondary battery of claim 1, wherein the rupture strengths of the at least one inner pressure plate and of the final pressure plate increase from an innermost pressure plate to the final pressure plate.

8. The secondary battery of claim 1, wherein the shape of the case is selected from one of the group of a prism and a cylinder.

9. The secondary battery of claim 1, wherein the secondary battery is a motor drive battery.

10. The secondary battery of claim 1, wherein the final rupturable pressure plate is adapted to rupture at a preselected time after the at least one inner rupturable pressure plate has ruptured.

11. The secondary battery of claim 1, wherein the at least one inner rupturable pressure plate comprises a plurality of inner rupturable pressure plates.

* * * * *